(12) United States Patent
Perkins et al.

(10) Patent No.: US 11,229,194 B2
(45) Date of Patent: Jan. 25, 2022

(54) FLY ROD INCLUDING CAST SENSORS

(71) Applicant: Happy Medium, LLC, St. Louis, MO (US)

(72) Inventors: Charles C. Perkins, Boston, MA (US); David W. Finnegan, Manchester, VT (US); Daniel M. Pollmann, St. Louis, MO (US)

(73) Assignee: Happy Medium, LLC, St. Louis, MO (US)

( * ) Notice: Subject to any disclaimer, the term of this patent is extended or adjusted under 35 U.S.C. 154(b) by 68 days.

(21) Appl. No.: 16/254,179

(22) Filed: Jan. 22, 2019

(65) Prior Publication Data

US 2020/0008410 A1   Jan. 9, 2020

Related U.S. Application Data

(60) Provisional application No. 62/694,626, filed on Jul. 6, 2018.

(51) Int. Cl.
| | |
|---|---|
| *A01K 87/00* | (2006.01) |
| *G01P 13/00* | (2006.01) |
| *G01P 15/08* | (2006.01) |
| *G01P 15/18* | (2013.01) |

(52) U.S. Cl.
CPC ............ *A01K 87/007* (2013.01); *G01P 13/00* (2013.01); *G01P 15/0802* (2013.01); *G01P 15/18* (2013.01); *A63B 2220/40* (2013.01); *A63B 2220/833* (2013.01)

(58) Field of Classification Search
CPC ... A01K 87/007; G01P 13/00; G01P 15/0802; G01P 15/18; A63B 2220/40; A63B 2220/833
See application file for complete search history.

(56) References Cited

U.S. PATENT DOCUMENTS

| | | | | |
|---|---|---|---|---|
| 4,918,851 | A * | 4/1990 | Peikin | A01K 87/007 36/4 |
| 7,021,140 | B2 * | 4/2006 | Perkins | A01K 87/00 473/219 |
| 9,195,370 | B1 * | 11/2015 | Hlatky, Jr. | G06Q 50/02 |
| 9,609,856 | B1 * | 4/2017 | Little | G08B 21/18 |
| 9,773,330 | B1 * | 9/2017 | Douglas | G06F 3/0346 |
| 10,545,558 | B1 * | 1/2020 | Douglas | G06F 1/325 |
| 2009/0158635 | A1 * | 6/2009 | Hope | A01K 97/125 43/4.5 |
| 2014/0358483 | A1 * | 12/2014 | da Rosa | G01D 9/28 702/188 |
| 2015/0057968 | A1 * | 2/2015 | Bailey | G06F 15/0225 702/150 |
| 2016/0353725 | A1 * | 12/2016 | Worley, III | A01K 87/007 |
| 2018/0043210 | A1 * | 2/2018 | Niehaus | A63B 24/0006 |
| 2018/0295826 | A1 * | 10/2018 | Blackadar | A01K 99/00 |

* cited by examiner

*Primary Examiner* — Natalie Huls
(74) *Attorney, Agent, or Firm* — Lewis Rice LLC

(57) ABSTRACT

A fly rod including sensors and methods of using the same are provided, particularly where the sensors assist the user in casting or in logging data associated with fishing activities. In a described embodiment, the fly rod comprises: a handle portion that includes a butt end; a center shaft portion that extends from the handle portion; a tip portion that extends from the shaft portion and includes a tip; a first movement sensor disposed in the tip portion; and a second movement sensor spaced apart from the first sensor.

20 Claims, 6 Drawing Sheets

FLY ROD INCLUDING CAST SENSORS

CROSS REFERENCE TO RELATED APPLICATION(S)

This application claims the benefit of U.S. Provisional Application Ser. No. 62/694,626, filed Jul. 6, 2018, the entire disclosure of which is herein incorporated by reference.

BACKGROUND OF THE INVENTION

1. Field of the Invention

This disclosure is related to the field of fishing equipment. More particularly to fishing equipment that utilizes sensors to provide feedback on casting and other elements of fishing.

2. Description of the Related Art

Fishing, and fly fishing, is an ancient activity. Believed to have been first developed in the second century, the sport of fly fishing had become a sport of gentlemen by the fifteenth century. *The Book of Saint Albans*, written in 1486, discusses techniques and tools for fly fishing along with hunting and falconry. Originally, fly fishing would have been used as a means of sustenance, and was likely popular with those that lived near streams or other sources of flowing water where accurate casting and presentation was essential to catch fish species moving in the water. However, it is now seen as a relaxing pastime to most of its adherents.

While the equipment of fly fishing has improved over the years from bamboo poles and silk lines to incorporate modern plastics, carbon composites, and other space age materials, the basics of fly fishing have essentially remained the same. The purpose of fly fishing is to land a fly, which is often a very light lure designed to resemble an insect or other invertebrate food source of the target fish, near a target fish in a way that it encourages the fish's natural behavior to lunge and catch the fly. The fly, which includes an integral hook, is then set to snare the fish's mouth and the fish is reeled back toward the fisherman and caught in a small net or by hand. The fly rod, therefore, generally only has two essential components. The rod, which is usually fairly long and very flexible, and the line, which is used to propel the fly to the target. Most fly rods also utilize a reel to hold a stockpile of line, but that is not strictly necessary.

Because the fly is designed to imitate a natural insect in many cases, it is usually very light. Often dry flies are used, which flies are designed to land and sit on the surface of the water like a landing insect. Other types of flies, such as nymphs, are designed to sink below the water. Regardless of the types of flies used, but particularly with dry flies, one of the key components of success is the ability to land the fly in a way that causes a fish strike. In spinner or bait fishing where a lure or bait are used, casting is accomplished by throwing the lure or bait, which is generally quite heavy, in the manner of a catapult, using the rod as the catapult arm. The flying lure or bait is generally heavy enough to pull the very light line behind it a substantial distance. The lure or bait is then moved through the water and the movement, as opposed to the landing, is designed to attract the fish.

In fly casting, the very low weight of a dry fly (and even many nymphs) would make it impossible for the fly to carry any length of line behind it if it was traditionally cast. Instead, in fly casting, the line itself is weighted to provide for the impulse to propel the fly. Generally, the fly will be attached to a short leader so as to make the connection between it and the line near invisible to fish. The weighted line is then cast using various movements to propel the line to a desired target and land the fly in the manner of a landing insect. Landing of the fly is often referred to as "presentation" and is in many respects the most important part of a fly cast to catch fish. The fly cast generally needs to be with a correct motion to propel the line a target distance to a target location (namely to where fish are expected to be), and land the fly in a natural manner. In this way, the fly is presented to target fish in a manner that is more likely to see them strike.

Fly casting is not particularly complicated, in theory. However, like accurately swinging a golf club, it utilizes certain very specific motions that need to be carried out repeatedly and consistently to avoid frustration and to result in the fly landing where it is desired to. The need to master a consistent fly fishing motion to be able to fly fish enjoyably is often off-putting to new or potential fly fishermen. Because of the length of line, the need to move the rod in a particular motion, and the need to release and re-catch the line at particular times to insure it plays out correctly, beginning a fly fishing hobby is often an intimidating task. For this reason, a majority of fishermen will generally utilize spinners or bait as the process is considered more straight-forward and more quickly learned.

To learn fly fishing casting, there are a plethora of books and videos. However, it is often necessary for the beginner to simply practice, a lot. While practice combined with knowledge of the theory will eventually teach the correct motions, the process can be short-circuited and accelerated if the fisherman has feedback on what they are doing right and wrong while they are casting. Traditionally, this feedback has come from a skilled trainer or guide who can watch the fisherman and make corrections based on what they see. They can also specifically guide the fisherman through the motions (often slower) to help them to "feel" the motion they need. Such skilled trainers, however, are often quite expensive, and this can result in a different intimidation to take up fly fishing as a sport.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a fly rod comprising: a handle portion that includes a butt end; a center shaft portion that extends from the handle portion; a tip portion that extends from the shaft portion and includes a tip; a first movement sensor disposed in the tip portion; and a second movement sensor spaced apart from the first sensor.

In an embodiment, the fly rod further comprises: a small chipset; and a main chipset disposed in the handle portion; wherein the second sensor is disposed at the main chipset; wherein the first sensor is disposed at the small chipset; and wherein the main chipset is larger than the small chipset.

In an embodiment of the fly rod, the first movement sensor and second movement sensor both have an electrical connection to the main chipset.

In an embodiment of the fly rod, the electrical connection comprises at least one wire that runs from the tip portion to the handle portion.

In another embodiment, the fly rod includes a power source, wherein the power source is electrically connected to the first movement sensor, the second movement sensor, and the main chipset, and wherein the power source is disposed in the handle portion.

In an embodiment of the fly rod, the first movement sensor includes a 3 axis accelerometer and the second movement sensor includes a 9 axis accelerometer.

In another embodiment, there is provided a method for sensing the movement of a fly rod, the method comprising: providing a fly rod having a handle portion that includes a butt end, a center shaft portion that extends from the handle portion, a tip portion that extends from the shaft portion and includes a tip, a first movement sensor disposed in the tip portion, a second movement sensor spaced apart from the first sensor, and a processor disposed within the fly rod; generating first movement sensor data from the first sensor during a first cast of the fly rod; generating second movement sensor data from the second sensor during the first cast of the fly rod; and the processor determining a first path of the tip of the fly rod during the first cast of the fly rod from the first movement sensor data and the second movement sensor data.

In an embodiment, the method further comprises: storing the determined first path in a memory; repeating the providing, generating first movement sensor data, generating second movement sensor data, and the processor determining to determine a second path of the tip of the fly rod during a second cast of the fly rod; and storing the determined second path in the memory.

In an embodiment of the method, the memory is disposed in the fly rod.

In an embodiment of the method, the memory is disposed in a mobile device, and the first movement sensor and second movement sensor are capable of wirelessly communicating with the mobile device.

In another embodiment, the method further comprises comparing the first path to the second path.

In another embodiment, the method further comprises providing feedback based on the results of comparing the first path to the second path.

In an embodiment of the method, the feedback is audible feedback.

In an embodiment of the method, the feedback is visible feedback.

In another embodiment, the method further comprises providing a hypothetical path in a memory.

In another embodiment, the method further comprises comparing the first path to the hypothetical path.

In another embodiment, the method further comprises providing feedback based on the results of comparing the first path to the hypothetical path.

In an embodiment of the method, the feedback is audible feedback.

In an embodiment of the method, the feedback is visible feedback.

In another embodiment, there is provided a system for storing fishing data comprising: a fly rod, wherein the fly rod comprises: a handle portion that includes a butt end; a center shaft portion that extends from the handle portion; a tip portion that extends from the shaft portion and includes a tip; a first movement sensor disposed in the tip portion; and a second movement sensor spaced apart from the first sensor; a mobile device, wherein the mobile device is in communication with at least one of the first movement sensor and the second movement sensor; and a wader sensor, wherein the wader sensor is disposed in a set of waders and is in communication with the mobile device.

DETAILED DESCRIPTION OF THE PREFERRED EMBODIMENT(S)

Figure 1:
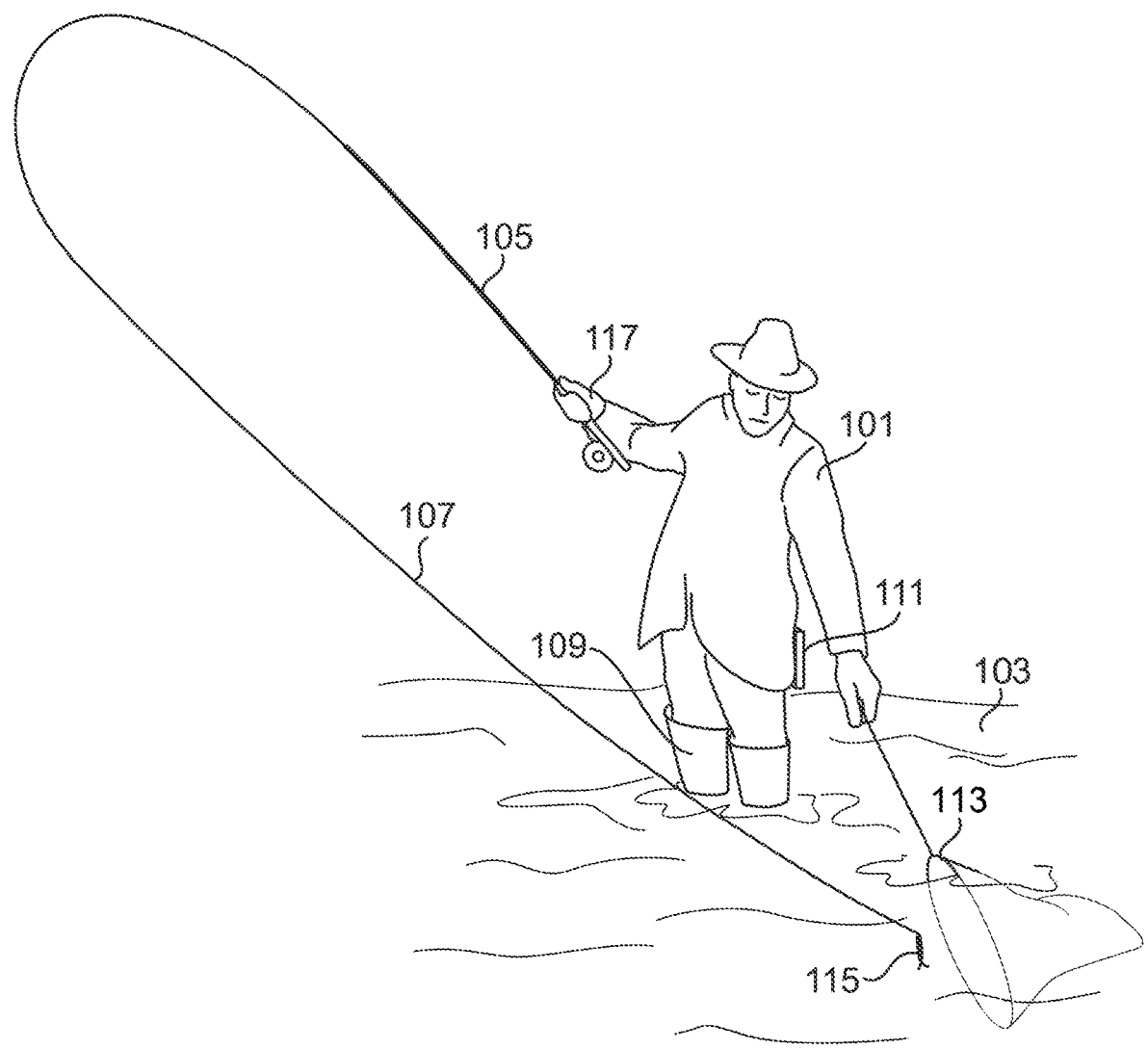
FIG. 1 depicts an embodiment of a fly fisherman showing where sensor elements may be provided.

This disclosure is focused on a fly rod including sensors and methods of using the same, particularly where the sensors assist the user in casting or in logging data associated with fishing activities.

Because of these and other problems in the art, described herein is a fly rod and associated fly fishing gear that are designed to provide real-time or near real-time feedback to a fisherman. The feedback serves three primary purposes. The first, and generally most important, is to provide feedback on each cast about the specifics of how the cast was made. This can allow for the fisherman to both practice their casting motion and recognize a correct versus incorrect motion and to analyze their casting when they are actually fishing. This can help them identify scenarios where they may be introducing errors into their casts. While this is the primary purpose of the gear in most embodiments of the invention, a second form of feedback is also available and it is generally related to the results of the cast. This can include items such as the distance the fly goes, the way it lands in the water, and providing a strike detector to notify the fisherman that they have caught a fish. The third form of feedback is generally environmental and serves to provide the fisherman with a record of conditions in which they are fishing as well as the results of any fishing trip.

This last type of feedback is generally not used in practice scenarios, but provides for the ability to both analyze specific past performance, and plan for new fishing trips. The information can assist the fisherman in real time or near real time as they are fishing to locate a target fish population, assist them in planning a fishing expedition and location based on prior performance, or assist third parties in tracking the results of their fishing expedition. The third parties can be other fisherman that may be interested in such information to determine how and where they should be fishing, to game management groups who can be monitoring the health of fisheries to make sure that concerns do not exist.

Generally, the systems and methods discussed herein will operate by providing a plurality of sensors in a variety of locations connected with the fisherman. These sensors will generally communicate, via a network, with a computer carried by the fisherman or to which the sensors are connected after a fishing trip or practice session. The computer will generally have software thereon to interpret the output of the sensors and provide the output as feedback specific to the casting motion, result of cast, and/or environmental conditions.

Throughout this disclosure, the term "computer" describes hardware, which generally implements functionality provided by digital computing technology, particularly computing functionality associated with microprocessors.

The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices that are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

For purposes of this disclosure, there will also be significant discussion of a special type of computer referred to as a "mobile device". A mobile device may be, but is not limited to, a smart phone, tablet PC, e-reader, or any other type of mobile computer. Generally speaking, the mobile device is network-enabled and communicating with a server system providing services over a telecommunication or other infrastructure network. A mobile device is essentially a mobile computer, but one that is commonly not associated with any particular location, is also commonly carried on a user's person, and usually is in real-time or near real-time communication with a network.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g. "a remote host"), or may, in verb form, refer to a server providing a service over a network ("hosts a website"), or an access point for a service over a network.

Throughout this disclosure, the term "real-time" generally refers to software performance and/or response time within operational deadlines that are effectively generally contemporaneous with a reference event in the ordinary user perception of the passage of time for a particular operational context. Those of ordinary skill in the art understand that "real-time" does not necessarily mean a system performs or responds immediately or instantaneously. For example, those having ordinary skill in the art understand that, where the operational context is a graphical user interface, "real-time" normally implies a response time of about one second of actual time for at least some manner of response from the system, with milliseconds or microseconds being preferable. However, those having ordinary skill in the art also understand that, under other operational contexts, a system operating in "real-time" may exhibit delays longer than one second, such as where network operations are involved which may include multiple devices and/or additional processing on a particular device or between devices, or multiple point-to-point round-trips for data exchange among devices. Those of ordinary skill in the art will further understand the distinction between "real-time" performance by a computer system as compared to "real-time" performance by a human or plurality of humans. Performance of certain methods or functions in real-time may be impossible for a human, but possible for a computer. Even where a human or plurality of humans could eventually produce the same or similar output as a computerized system, the amount of time required would render the output worthless or irrelevant because the time required is longer than how long a consumer of the output would wait for the output, or because the number and/or complexity of the calculations, the commercial value of the output would be exceeded by the cost of producing it.

FIG. 1 provides for an embodiment of a fly fisherman (101) wading in a body of water (103). While fly fishing can also be performed from a boat or from shore, and generally is in conjunction with fly fishing on lakes or in the ocean, the fisherman (101) wading in a river to locate their target fish, and be able to cast to them is the most recognized form of fly fishing, and the area where fly fishing is generally dominant compared to use of bait and spinners In the embodiment, of FIG. 1, sensors are provided as part of the fisherman's gear. The fly rod (105) will generally include sensors, such as is discussed below in conjunction with FIG. 2. There may also be sensors in the line (107) (such as a traditional strike indicator), and sensors in the fisherman's waders (109) or clothing. Sensors may also be included in a net (113) or the leader or lure (115). However, the latter is generally not preferred as it increases the weight of the lure (115). These sensors will all provide their data to a transmitter, which may be specific to the sensor, or may collect the information of multiple sensors. The sensor data is then transferred to a mobile device (111) of the fisherman (101). Most commonly this will be a smart phone or similar device running application software (an "app") specific to interpreting the sensor output. This, however, is not required and the mobile device (111) may be another mobile device (111) of a type commonly carried by fisherman (101) (for example a global position system (GPS) or similar location device) or may be a dedicated mobile device (111) specifically designed and constructed to interpret the sensor data and display output. The mobile device (111) will generally interpret the sensor data and provide feedback to the fisherman (101) based on the output of the sensors. The feedback may be based purely on the sensor data, or may include data added by the mobile device (111). For example, the mobile device (111) can provide, but is not limited to, location information based on its internal global position systems (GPS) or compass information based on its internal compass. Further, the mobile device (111) may provide audible and/or visible feedback to the user in real-time as the user casts the fly rod (105).

In operation, the fisherman (101) will generally utilize the system as follows. They may make the system active so that it knows to communicate with sensors and record data. This will generally be done to preserve battery life in the sensors and related components as well as that of the mobile device (111). The fisherman (101) will then proceed to locate where they are interested in first casting. In the process of doing this, they may consult the app. At this stage, they would generally be seeking environmental information. This may include their current location and with that information, they could look up any prior fishing success or failure of themselves or others in this location. They may be able to correlate this information with particular flies used, as well as other conditions (such as if it is windy, raining, or the air or water temperature). To obtain temperature and other environmental readings at their present location, sensors in their clothing (109) can detect air temperature, wind speed, humidity and other readings. In an alternative embodiment, this information can be obtained from sensors located elsewhere then in their clothing. For example, the mobile device (111) may access a website of local weather conditions, or sensors located on the rod (105) can be used to detect environmental conditions. Placement of a sensor in their waders (109), and particularly near their feet or on their legs can be used to determine water temperature as well as the current strength and depth.

Based on this information, and any other information the fisherman (101) may wish to utilize, they will generally select a fishing spot. Once selected, the fisherman (101) will begin to fish. As the fisherman (101) casts and reels in, the system will generally be recording the specifics of each cast including lure placement and rod movement. If the fishing is successful the fisherman (101) will often not consult this information while fishing, but it will simply be recorded for their evaluation upon their return home. If the fishing is unsuccessful, or if the fisherman (101) sees he is having a particular problem (e.g. the fly is not curving through the air as he wants it to), the user may consult the app to determine if there is a problem with his cast. The app can then provide the results of the sensors and how the fisherman (101) has been casting. In an embodiment, this can be broken down based on certain filters so the fisherman (101) may only look at certain kinds of casts (e.g. those where he is utilizing a twist at the end of the motion (a curve cast) to try and curve the fly). From this information the fisherman (101) can attempt to alter his movement to try and get the cast the way he wants it based on the feedback.

It should be recognized that the information from the sensors does not need to only be used in the field, but can be used in practice casting as well. In many cases, the ability to practice casting with the rod (105) and obtain real-time feedback on the cast can be particularly valuable. In an embodiment, practice casts can even be performed with no line (107) on the rod (105), or with the line (107) not actually being cast. In this way, the practice can be performed in a relatively small area. The reason why the rod (105) can be used to practice casting without use of the line (107) is because the rod (105) can determine the nature of the cast from the movement of the rod (105). Output of the sensors can then be combined with software on the mobile device (111), which can simulate the cast. Thus, the user may cast the rod (105) without a line (107), the sensors determine how the cast has been performed, and then the mobile device (111) displays a theoretical cast of the rod (105) that can be based on certain conditions the user has entered (e.g. the proposed line weight, fly, and conditions).

It should be apparent that, in an embodiment, the above can be used as the foundation for a fly casting game to teach skills. The mobile device (111) could present the fisherman (101) with a digital display of fishing conditions and have them attempt to perform a cast to a particular target. They can then dry cast with the rod (105), and the software can show them how close they came to the target. This allows the user to practice casting any type of cast, in any conditions, in relatively limited space.

Figure 2:
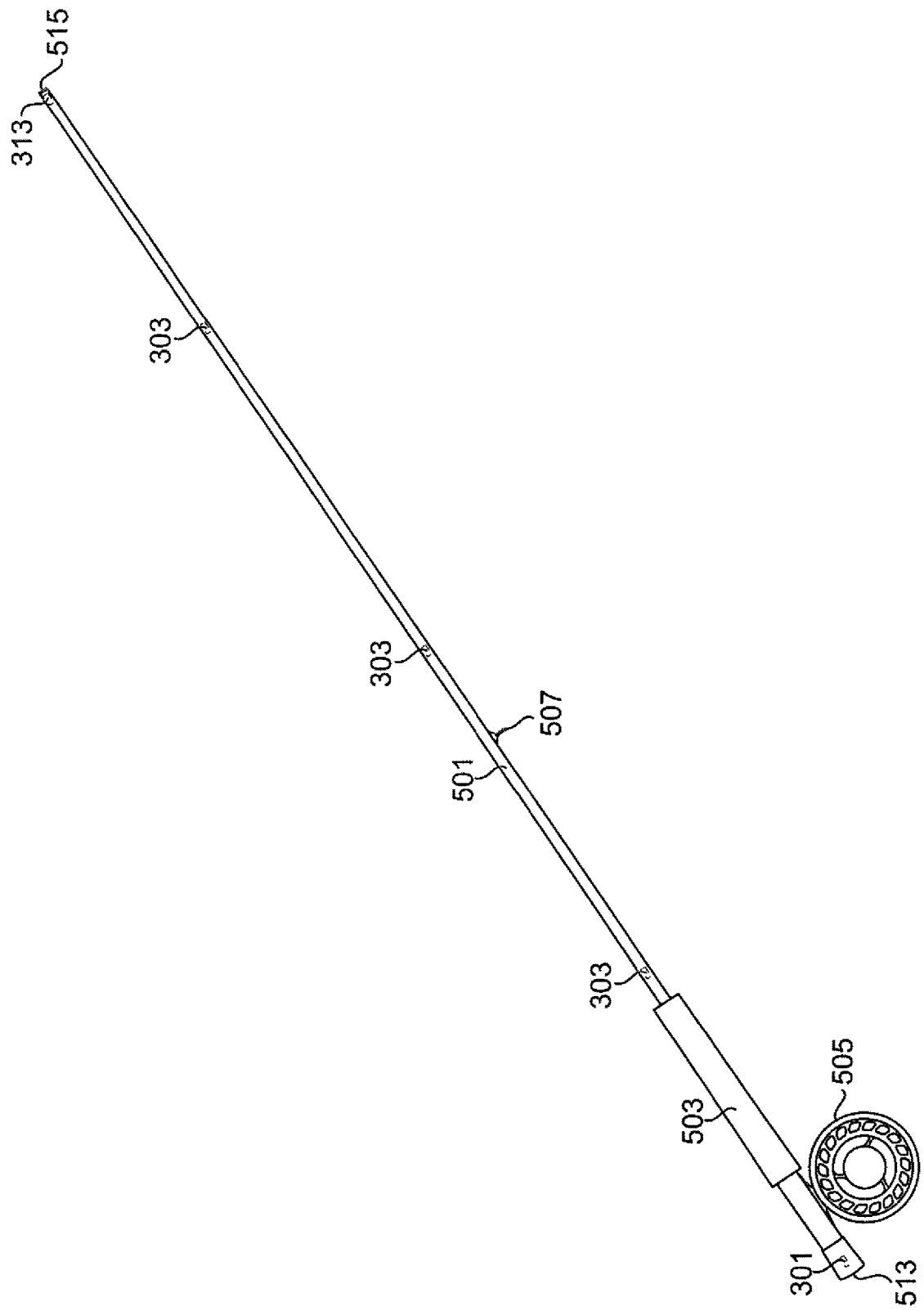
FIG. 2 depicts an embodiment of a fly rod showing sensor positioning.

FIG. 2 provides for an embodiment of a rod (105) that can serve to provide sensor data. The rod (105) comprises the standard components of the rod shaft (501) having a handle (503). The rod (105) generally tapers in diameter from a butt end (513) of the rod (105), which is the outermost portion of the handle (503), to a tip (515) of the rod (105). Alternatively, the rod (105) may only begin to taper from the end of the handle (503) opposite the butt end (513) to the tip (515), with the handle (503) being substantially cylindrical. While the depicted embodiment provides a traditional one-handed rod, the systems and methods discussed herein may be used on a two-handed rod and the casting specifics adapted to two-handed spey casting without undue experimentation. The rod shaft (501) has a reel (505) attached thereto to provide the line (107), which line can pass through eyelets (507).

In the rod (105), there is generally provided a main chipset (301). The main chipset (301) is preferably located internal to the rod shaft (501) toward the butt end (513) and generally near or behind the position for the dominant (casting) hand in normal casting. There are also provided a plurality (generally 2-4 but more may be used, 2 are shown in the depicted embodiment) of small chipsets (303) and a tip chipset (313) in the rod (105). The tip chipset (313) is generally of identical construction to the other small chipsets (303) but will generally be located at or very close to the tip (515) of the rod (105), and the remaining will generally be spaced at various points along the rod (105). Often the small chipsets (303) will be evenly distributed down the length of the rod (105) between the tip (515) and the main chipset (301) in the butt end (513) of the rod (105). The primary difference between the main chipset (301) and the small chipsets (303) and tip chipset (313) is weight. The small chipsets (303) and particularly the tip chipset (313) are designed to be very light and generally will only comprise a single sensor, while the main chipset (301) will generally include more sensors, core electronics, and power sources that may be necessary for proposed operations.

In an embodiment, the small chipsets (303) and tip chipset (313) will each comprise a single 3 axis accelerometer. These will be connected to the main chipset (301) by very small wires running from the small chipsets (303) and tip chipset (313) to the main chipset (301). Wireless communication can be used in an alternative embodiment, but wires are preferred as they can be very light and are usually very flexible. Thus, weight in the rod body (501), and particularly at or toward the tip (515), which needs to flex and move very predictably, is minimized.

The main chipset (301) will, in an embodiment, include a 9 axis accelerometer, temperature and barometric pressure sensors, a microprocessor, local memory, and a wireless communication antenna but alternative and/or additional components may also or alternatively be included. The antenna will preferably be set up to utilize Bluetooth Low Energy (BLE) protocols or a similar protocol with a relatively small range and small power requirement. The main chipset (301) will generally be in wireless communication with the mobile device (111) and both will generally either be on the fisherman's person, or in close proximity when communication is desired so there is little need for a powerful communication antenna in the main chipset (301). Data collected by the main chipset (301) may be stored on the local memory, or the data may be transmitted to the mobile device (111) and stored on memory therein.

Also attached to the main chipset (301) is a power source. This can be a chemical battery (disposable or rechargeable) or a power generation system such as, but not limited to, a solar cell, wind generator, or kinetic drive system. The power source may be positioned so as to be accessible by opening up the handle (503) of the rod (105), or may be positioned internally and generally inaccessible, or in other manners.

Figure 3A:
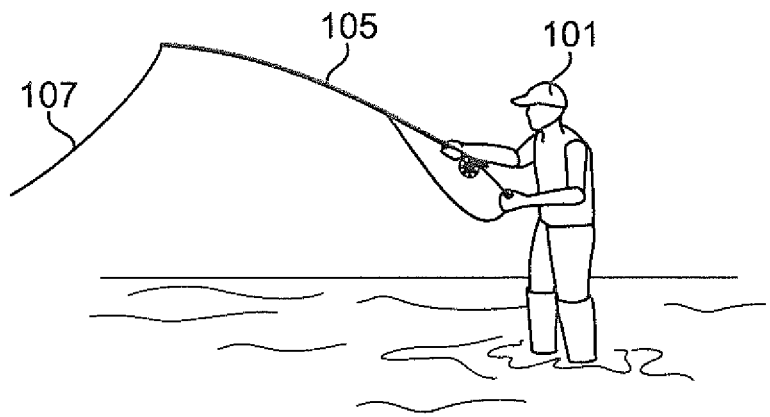
FIGS. 3A, 3B, 3C, 3D, 3E, and 3F depict an embodiment of stages of a typical overhead fly fishing cast.
Figure 3B:
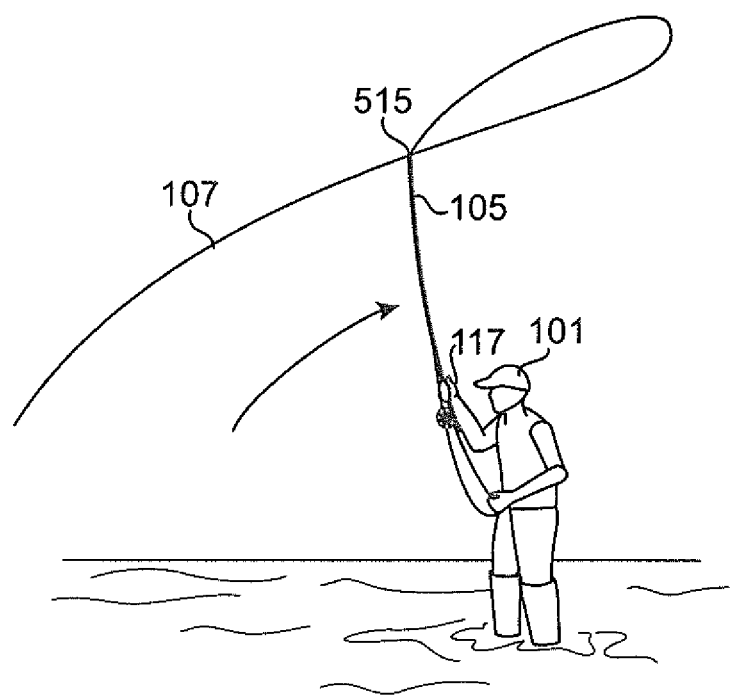
Figure 3C:
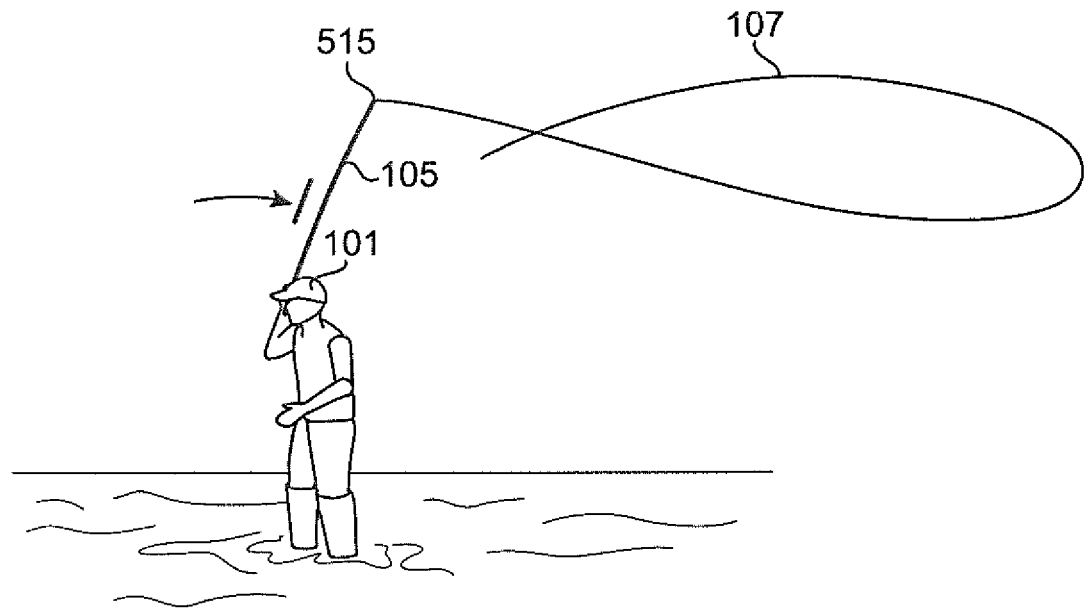

To understand how the rod (105) sensors work, it is easiest to first understand the basics of fly casting. FIGS. 3A-3F show a fly cast using a common overhead casting technique and illustrate how the sensors in the fly rod (105) can be used to detect the motion and provide corrections. FIGS. 3A-3F provide the rod (105) (and therefore line (107) and fly) motions in accordance with a theoretical "perfect cast". In such a cast, the fly rod (105) will generally begin pointed forward of the fisherman (101) as shown in FIG. 3A. The fisherman (101) will then rotate their hand (117) toward their body, generally with most of the motion being at the elbow as shown in FIG. 3B. The rod (105) ideally should come upward with a smooth acceleration and stop backward and upward as shown in FIG. 3C. The fisherman's hand (117) will generally be around their ear, but spaced from their head. In the movement, the rod tip (515) from FIG. 3B to FIG. 3C is intended to move in a substantially straight line.

Figure 3D:
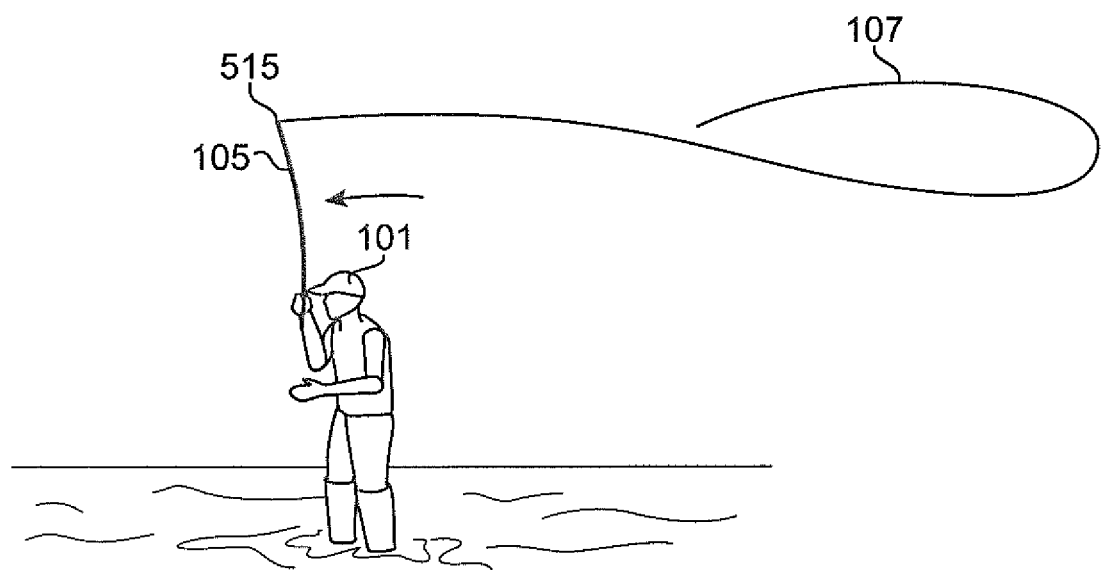

At the terminal position of FIG. 3C, the hand preferably stops suddenly. This causes the tip (515) of the rod to flex backward and the line (107) to play out behind the fisherman (101) in smooth airborne arc. The fisherman (101) then, as shown in FIG. 3D moves their hand (117) forward, again preferably with a smooth acceleration until they approach the starting point. Again, the hand (117) movement preferably stops suddenly in FIG. 3E. This causes the tip (515) to bend forward imparting a large impulse to the line (107) causing the line (107) to sail straight forward in the direction of the movement of the rod (105). As the line (107) flies outward, the fisherman (101) will then generally lower the rod (105) toward the ground/water as shown in FIG. 3F so that the line (107) falls onto the water surface in a generally linear and flat pattern.

Figure 3E:
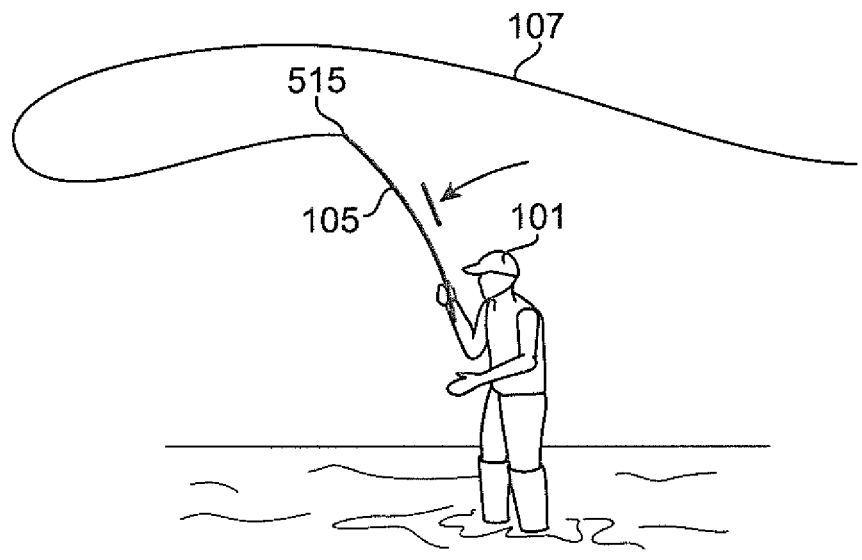
Figure 3F:
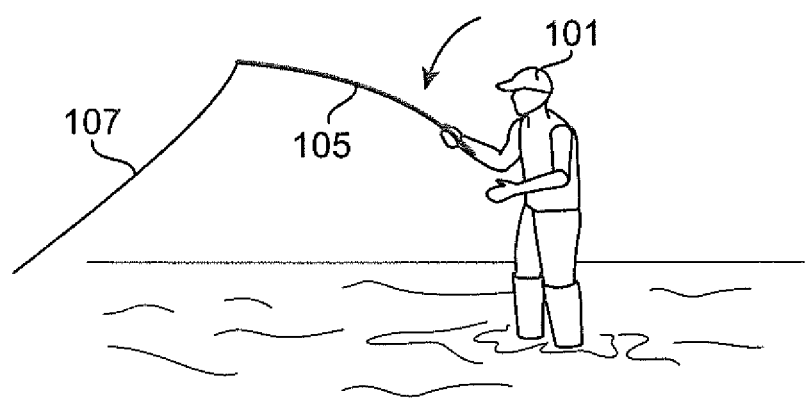

A couple of the key elements of the cast are the movement of a tip (515) in what is generally a line both forward and backward during the motions of FIGS. 3B to 3E, the sudden stops in this motion in FIGS. 3C and 3E that cause the rod tip (515) to bend and store energy to impart impulse to the line (107), and the positioning of the rod (105) at both direction changes in FIGS. 3C and 3E. Movement of the rod tip (515) essentially provides the impulse for the fisherman (101) to impart a desired direction of motion on the line (107), and also helps to keep the line (107) from tangling as the line (107) propels the fly to the target. The sudden stops provide for the storage of energy so that the line (107) can play out in the cast. This provides distance. Finally, the positioning of the rod (105) at the changes inhibits the line from hitting obstacles or the ground behind the fisherman, provides control over direction of cast, and provides for a good presentation of the fly.

In the motion of FIGS. 3A-3F, the sensors in the main (301), small (303), and tip (313) chipsets will generally be able to record as follows. Sensors in the main (301) and small (303) chipsets will generally be able to determine the nature of the acceleration and declaration of the rod (105) and the bending of its main shaft (501), as well as the general motion of the shaft (501) relative to the ground or other objects. The tip chipset (313) can determine the linearity of the tip (515) movement, as well as the bend of the tip (515) relative the rest of the shaft (501). The latter element will often be determined by sensors more toward the tip (515) of the rod (105) than the handle (503), as they will be more sensitive to movement of the tip (515) versus the shaft (501) generally.

The tip chipset (313) can generally also determine the linear movement of the tip (515) during the motion of FIGS. 3B to 3E. The distance the line has or is expected to travel can be inferred from the tip (515) movement particularly if there is not a line (107) attached to the rod (105). If there is a line (107), a strike indicator located near the fly can verify the distance actually traveled using a motion sensor.

It should be apparent from FIGS. 3A-3F that the rod (105) of FIG. 2 is able to essentially map the movement of all parts of the rod (105) in 3D space. From this information, the mobile device (111) can interpret and display the movement of the rod (105). As the rod (105) essentially serves to impart all the characteristics of the line (107) flight (except for line release characteristics that are purely dependent on the user's hand manipulation of the line), movement of the rod (105) can be used to estimate the target distance and location of the cast. Further, it should be apparent that while FIGS. 3A-3F show the movement of the rod (105) in a theoretical overhead cast, the motion collecting information works regardless of the nature of the cast (how good or poor it may be) and can provide feedback regardless of the motion actually imparted to the rod (105). Further, the system can be programmed to recognize any type of cast, regardless of how complicated, and compare the fisherman's (101) actual cast against any model cast. The library of casts may be stored on the mobile device (111) or accessible from a remote server via a network.

The library of casts may be formed from theoreticals, e.g. the desired motion of the sensors can be entered based on mathematical and theoretical movements based on how the rod (105) is desired to move, or can be entered by having a particularly skilled caster perform one or more casts with the rod (105) and have the rod (105) record their motion as a desired model cast. Multiple casts may be averaged, or may be used to provide a range of motions that is still considered to be "good" casts. The latter will often be preferred as such an arrangement can allow for the fisherman to compare against experts actually performing the casting using essentially the identical rod (105) and it recognizes that there is likely some human error introduced in all casts regardless of skill so the model casts include some leeway.

The information from the embodiment of the rod (105) depicted in FIG. 2 provides for a very powerful analysis tool on its own. Particularly when it comes to casting practice. In the field, however, the rod (105) is still useful and the information form the sensors in the rod (105) can be combined with other sensors and provide for additional information. In the first instance, as the tip chipset (313) in the tip (515) of the rod (105) can sense movement of the rod tip (515), it can act as a strike indicator as the tip (515) will generally bend, at least somewhat, when a fish takes the fly. Further, the main chipset (301), as it includes other sensors such as temperature and pressure in a preferred embodiment can act as a weather sensor. This can allow a fisherman (101) to evaluate weather conditions to determine where fish may be located or an appropriate type of fly to use. In certain embodiments, the rod (105) would also be able to detect wind strength and direction. This could be through inclusion of a wind sensor, or by using the rod (105) as a crude wind gauge with its flexibility in the wind being used to estimate the wind speed and direction. This would allow for a skilled fisherman to adjust their positioning, and their casting, based on the conditions they are casting in.

Figure 4:
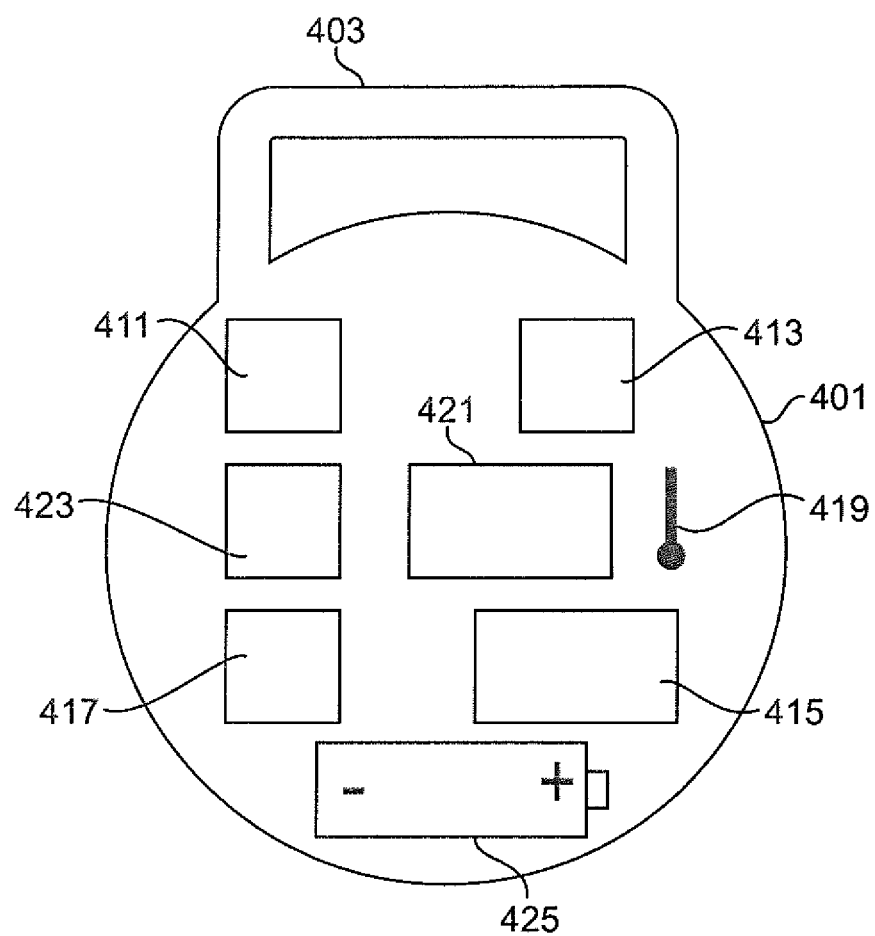
FIG. 4 shows a general block diagram of an embodiment of a wader sensor.

While in most embodiments, the rod (105) will be the primary sensor apparatus, the rod (105) does not need to include all the sensors and other sensors may be networked with those in the rod (105) to provide additional functionality. As indicated in FIG. 1, in an embodiment, the system includes a wader sensor (401). An embodiment of such a wader sensor (401) is shown in FIG. 4. The wader sensor (401) is designed to mount to the outside of the fisherman's waders (109), generally near the foot. In an embodiment, it is configured to attach to boot laces via a clip, opening (403) or other similar attachment structure. In a still further, embodiment, it may be built into the wader (109) or provided in a custom-sized pocket in the wader (109). The wader sensor (401) is generally designed to be submerged in the water when the fisherman enters the stream. In this way, the wader sensor (401) allows for a fisherman to evaluate underwater conditions including temperature, currant strength and the like. This can then be combined with environmental information from the rod (105) (which is above the water) to provide a more complete picture of environmental conditions. The sensor in FIG. 4 will generally include sensors for temperature (411), pressure (413), and potentially current (415). A current sensor (415) can actually assist in the fisherman's safety by warning them if the current is getting sufficiently strong it could harm their footing.

The wader sensor (401) can also include sensors to assist the fisherman in other aspects, such as a pedometer (417) to determine how far they have traveled (and potentially in which direction) and other information such as, but not limited to, soil or water composition sensors. Like the rod in FIG. 2, the wader sensor (401) of FIG. 4 will also generally include a (micro)processor (421), memory (423), a communication antenna for communicating with the wireless device and or main board in the rod (419), and a power supply (425). The power supply (425) may be of similar, or different, type to that in the rod (105). Similarly, the communication antenna will generally use BLE, or similar technology, to communicate to and from the rod (105). As should be clear from the disclosure, any of the chipsets and/or sensors may generally use BLE or a similar technology.

While FIG. 4 contemplates only a single wader sensor (401), it should be readily apparent to one of ordinary skill that the wader sensor (401) can be networked with other sensors distributed through other parts of the wader (109) (in the same manner the small chipsets (303) and tip chipset (313) are networked with the main chipset (301) in the rod (105)) to provide for additional and distributed information. Further, the wader sensor (401) may act as a server or client in a server/client relationship with any or all of the sensors in the wader (109), rod (105), and/or mobile device (111).

The final component of the system is generally the mobile device (111). As discussed previously, this is preferably a smartphone with appropriate software, or a similar computer, that the fisherman (101) would have with themselves when practicing or fishing, or with which they can connect upon a return home or conclusion of the activity. In an embodiment, the mobile device (111) may serve as a consolidator of information from the sensors, a display to interpret the sensor information in a form useable by the fisherman (101), and can provide increased processing power compared to the processors in the main chipset (301) and/or wader sensor (401).

The mobile device (111) will also generally provide additional functionality from built in functions. The primary of these will be geolocation information, which will allow the fisherman (101) to correlate fishing information with their location. This can allow for a fisherman (101) to determine the best conditions, gear, and times of year for fishing in particular locations. This information can be kept private, or the functionality of the mobile device (111) can allow it to be shared, such as via social media sites, with other fishermen. The information can also be combined with image information recorded by the mobile device (111). For example, the fisherman (111) could record images of fish caught and correlate those with the location, environmental, gear and casting information.

It should be apparent that the mobile device (111), when used in conjunction with the other elements of the system, can effectively provide a repository of large amounts of data associated with each and every fishing trip. This repository of data can then be mined, either just in conjunction with this particular individual's data collection, or in conjunction with a plurality of users' data collection. From this data, both specifics of fishing details can be obtained, as can macro scale data. For example, a Department of Natural Resources could consolidate all fish strikes in a particular area at a particular time of year over multiple years to evaluate the health of the fishery. Similarly, a user could compare all strikes at a particular location based on gear used, weather conditions, and time of year and determine the gear they should be using for a current or planned fishing trip. A user can even go so far as to determine if a planned trip would likely be productive or not based on the data, and may cancel a trip or reschedule.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for sensing the movement of a fly rod, the method comprising:
   providing a fly rod having a handle portion that includes a butt end, a center shaft portion that extends from the handle portion, a tip portion that extends from the shaft portion and includes a tip, a first movement sensor disposed in the tip portion, a second movement sensor spaced apart from the first sensor, and a processor disposed within the fly rod;
   generating first movement sensor data from the first sensor during a first cast of the fly rod;
   generating second movement sensor data from the second sensor during the first cast of the fly rod; and
   the processor using the first movement sensor data and the second movement sensor data to determine a first path of the tip of the fly rod during the first cast of the fly rod and to map a first movement of the fly rod in three-dimensional space.

2. The method of claim 1, further comprising:
   storing the determined first path and first movement in a memory;
   generating third movement sensor data from the first sensor during a second cast of the fly rod;
   generating fourth movement sensor data from the second sensor during the second cast of the fly rod; and
   the processor using the third movement sensor data and the fourth movement sensor data to determine a second path of the tip of the fly rod and to map a second movement of the fly rod in three-dimensional space during the second cast of the fly rod; and
   storing the determined second path and the second movement in the memory.

3. The method of claim 2, wherein the memory is disposed in the fly rod.

4. The method of claim 2, wherein the memory is disposed in a mobile device, and the first movement sensor and second movement sensor are capable of wirelessly communicating with the mobile device.

5. The method of claim 2, further comprising comparing the first path to the second path.

6. The method of claim 5, further comprising providing feedback based on the results of comparing the first path to the second path.

7. The method of claim 6, wherein the feedback is audible feedback.

8. The method of claim 6, wherein the feedback is visible feedback.

9. The method of claim 5, further comprising comparing the first movement to the second movement.

10. The method of claim 9, further comprising providing feedback based on the results of comparing the first movement to the second movement.

11. The method of claim 10, further comprising providing the feedback also based on the results of comparing the first path to the second path.

12. The method of claim 1, further comprising providing a hypothetical path in a memory.

13. The method of claim 12, further comprising comparing the first path to the hypothetical path.

14. The method of claim 13, further comprising providing feedback based on the results of comparing the first path to the hypothetical path.

15. The method of claim 13, wherein the feedback is audible feedback.

16. The method of claim 13, wherein the feedback is visible feedback.

17. The method of claim 13, further comprising comparing the first movement to a hypothetical movement in the memory.

18. The method of claim 17, further comprising providing feedback based on the results of comparing the first movement to the hypothetical movement.

19. The method of claim 18, further comprising providing the feedback also based on the results of comparing the first path to the hypothetical path.

20. The method of claim 1 wherein the first sensor comprises a 3-axis accelerometer and the second sensor comprises a 9-axis accelerometer.

* * * * *